Figure 1:
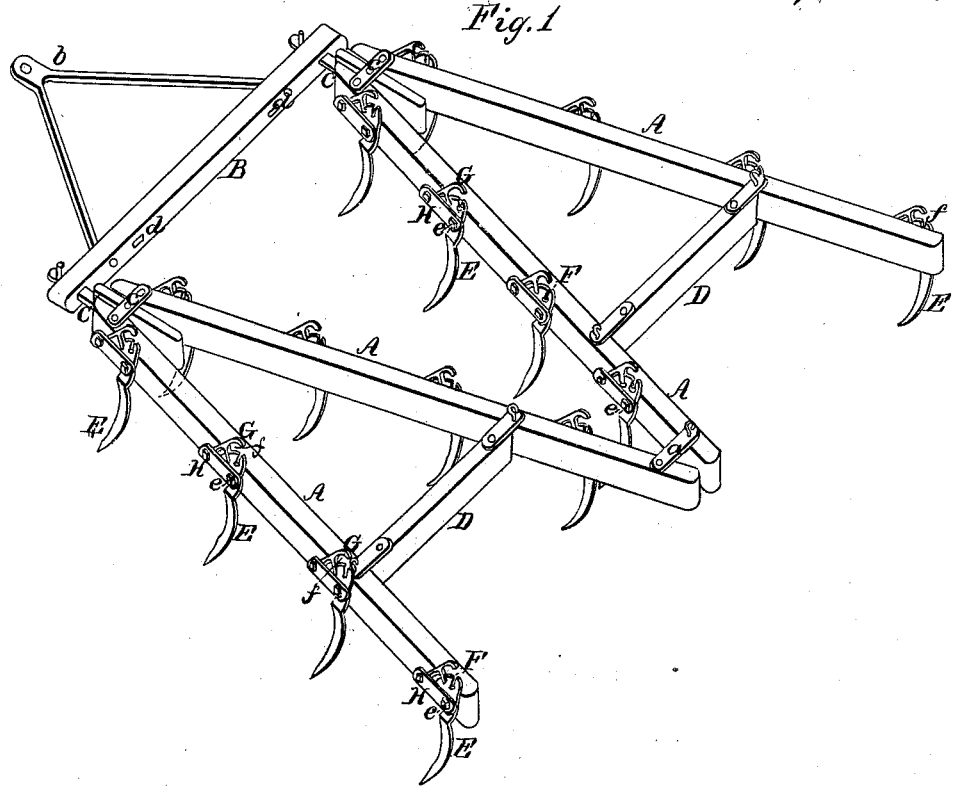

E. Emmert.
Harrow.
N° 93,692. Patented Aug. 17, 1869.

Witnesses
Joel Peyton
Balt'r D. Long

Inventor
Ezra Emmert
by his atty
Wm. D. Baldwin

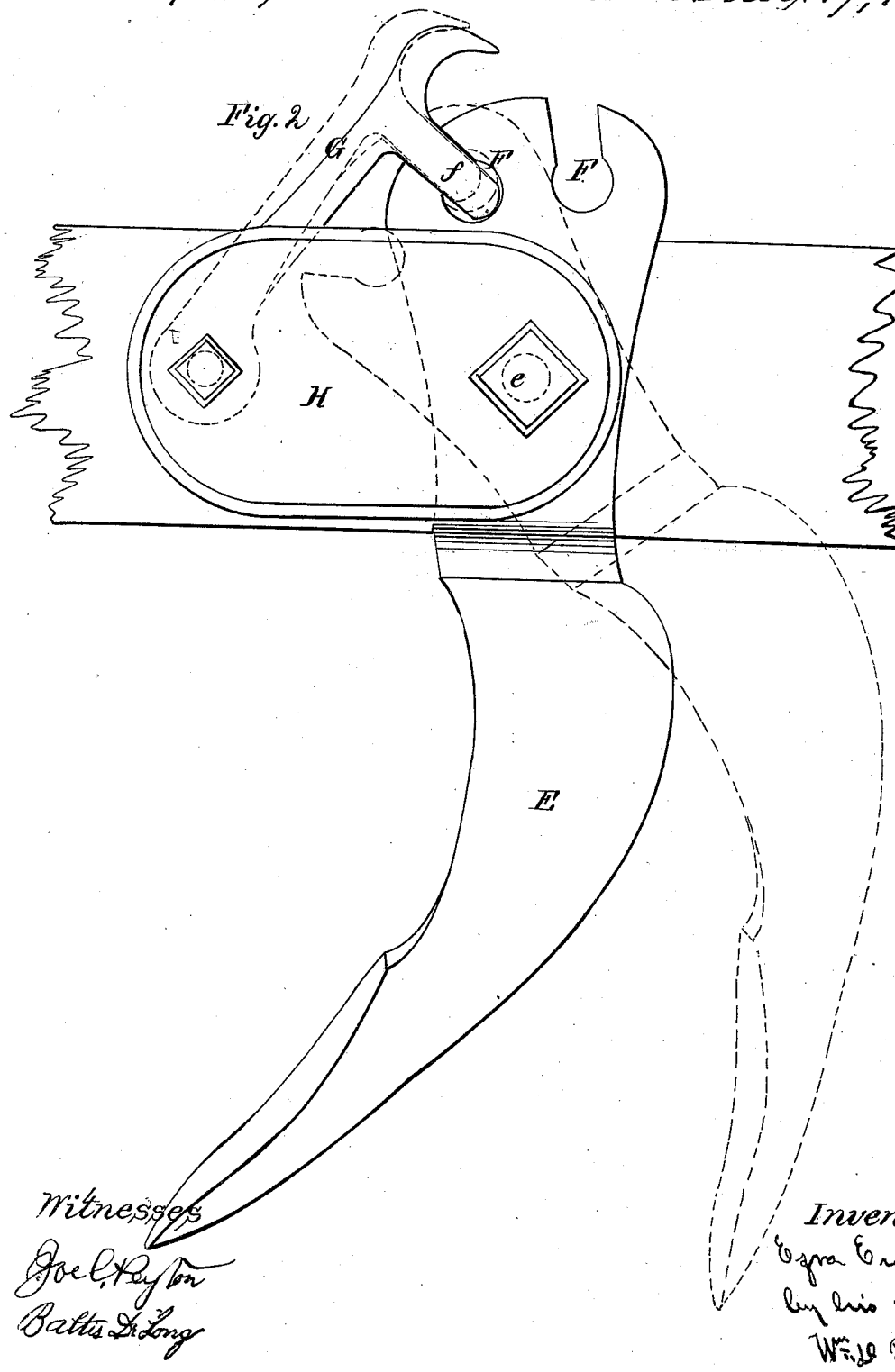

United States Patent Office.

EZRA EMMERT, OF FRANKLIN GROVE, ILLINOIS.

Letters Patent No. 93,692, dated August 17, 1869.

IMPROVEMENT IN CULTIVATOR AND HARROW COMBINED.

The Schedule referred to in these Letters Patent and making part of the same.

*To all whom it may concern:*

Be it known that I, EZRA EMMERT, of Franklin Grove, in the county of Lee, and State of Illinois, have invented certain new and useful Improvements in Cultivators and Harrows, of which the following is a full, clear, and exact description.

It is the object of my invention to so construct a combined cultivator and harrow that it shall be equally adapted to cultivating or harrowing the soil, and readily changed from a cultivator to a harrow, and *vice versa;* and The improvements herein claimed consist, first, in the combination, with a harrow or cultivator-tooth, adapted to be pivoted to its frame or beam, and having notches (or teeth) upon its shank, of a vertically-moving pivoted brace or pawl, to engage with any one of said notches, to set the tooth at varying angles with its beam, and thereby regulate the depth of penetration of the tooth into the soil, as hereinafter set forth; secondly, in a novel method of connecting the side pieces or beams of a frame (each beam carrying cultivator or harrow teeth) with each other, and with a draught-link, in such manner as to allow either beam a slight longitudinal and sidewise or vibratory movement, independent of the other, to clear the teeth of obstructions and prevent clogging, as hereinafter set forth; and thirdly, in the combination, with two triangular frames, connected by a pivoted brace at or near their rear ends, of a draught-beam, connected with the draught-link of each frame, and connecting and bracing the frames at their front ends, as hereinafter set forth.

In the accompanying drawings—

Figure 1 represents a view in perspective of my convertible cultivator and harrow, and Figure 2, a side elevation, on an enlarged scale, of a tooth attached to its frame.

A A represent the side beams of two triangular sections of a frame, formed by connecting the sections by the pivoted brace $a$ at their inner rear ends, and by a beam or cross-piece, B, (to which a forked draught-bar, $b$, for the attachment of the team is secured,) at their front ends. This draught-beam B is slotted near its ends to receive coupling-links C C, which are pivoted between the front ends of the side pieces of the frames A A, to the bracing arms $c\ c$, which are also pivoted to the side pieces. These side pieces are connected and braced near their rear ends by a cross-piece, D D, pivoted to each side piece, and also adjustable toward or from the rear of the frames, to expand or contract them. When the frames are contracted, they are attached to the draught-beam at $d\ d$. The links C C, after being passed through the draught-beam B, receive pins, either of wood or metal, to hold them in place.

By my mode of bracing and hinging the side-beams to each other, it will be seen that if the teeth of one beam should become clogged or obstructed, it will swing backward and inward, and thus clear the teeth, and if one section should meet with greater obstruction than the other, it would also swing back, and at the same time sidewise toward the other section, thus clearing itself.

Each tooth E is pivoted to its beam by a bolt, $e$, so as to allow it a vertical-swinging motion, and is provided with notches F, upon the curved top of its shank. A bracing-arm, latch, or detent, G, is pivoted in front of the pivot of the tooth, to swing vertically, and has a projection, $f$, fitting the notches F in the tooth-shank. I prefer to use a metal plate or bracket, H, secured (outside of the tooth and detent) to the beam by the same bolts that secure the tooth and detent. This plate serves to protect the pivots, and the tooth and detent, and as it connects the two bolts, also serves to strengthen them.

When my machine is to be used as a cultivator for hard soil, the detent is placed in the front notch of the shank, (as shown in black, fig. 2,) and when used as a harrow, in light, broken soil, the detent is shifted to the rear notch, (as shown in red, fig. 2,) to prevent the teeth from clogging when the harrow is used in corn-stalk ground.

In going to and from the field, the detents are disengaged, and the teeth allowed to swing back. The machine is then supported upon the frame-pieces.

By disconnecting the sections, each one may be used as a cultivator or harrow.

Instead of two notches being made in the shank, as shown in the drawings, the tooth may be constructed with three or even more notches.

What I claim as my invention, and desire to secure by Letters Patent, is—

1. The combination of the vertically-swinging tooth, its notched shank, and its locking-detent, all constructed as set forth, for joint operation.

2. The combination of the pivoted beams A A, pivoted cross-piece D, and brace $c$, with the pivoted link C, all constructed and operating as described, for the purpose specified.

3. The combination of the triangular frames, the pivoted brace $a$, connecting their rear ends, the front connecting pivoted braces $c\ c$, the pivoted links C C, and the draught-beam B, all these parts being constructed for joint operation, substantially as set forth.

In testimony whereof, I have hereunto subscribed my name.

EZRA EMMERT.

Witnesses:
 GEORGE WEYENT,
 I. P. MILLER.